United States Patent [19]
Young

[11] 3,778,821
[45] Dec. 11, 1973

[54] AIRCRAFT CONTAINED PERSPECTIVE RADAR/DISPLAY AND GUIDANCE FOR APPROACH AND LANDING

[76] Inventor: David W. Young, 23685 Schoenborn St., Canoga Park, Calif. 91304

[22] Filed: Aug. 4, 1969

[21] Appl. No.: 847,121

[52] U.S. Cl. ............... 343/5 R, 343/7 TA, 343/7.9
[51] Int. Cl. .............................................. G01s 9/02
[58] Field of Search ................... 343/5 R, 7 TA, 7.9

[56] References Cited
UNITED STATES PATENTS

| | | | |
|---|---|---|---|
| 3,653,044 | 3/1972 | Breeze et al. | 343/5 R |
| 2,611,126 | 9/1952 | Irving | 343/5 CM X |
| 3,093,822 | 6/1963 | Balding | 343/5 X |
| 3,098,929 | 7/1963 | Kirchner | 343/7.9 X |
| 3,127,604 | 3/1964 | Herriott | 343/5 X |
| 3,164,830 | 1/1965 | Powley et al. | 343/7 TA UX |
| 3,193,824 | 6/1965 | Eitzenberger et al. | 343/7.9 |

OTHER PUBLICATIONS

Young, D. W. et al. Research Study of an Aircraft-–Contained Radar Zero–Zero Landing System, NASA Report N68-16635 (CR-73184), Abstract in Scientific and Technical Aerospace Reports, Vol. 6, No. 7, April 8, 1968:

Primary Examiner—T. H. Tubbesing
Attorney—Nilsson, Robbins, Wills & Berliner

[57] ABSTRACT

A radar system is disclosed as for providing the pilot of an aircraft with a perspective presentation that is sufficient, for example to land the aircraft under conditions of reduced visibility including zero-zero. The system incorporates a cathode ray tube utilizing B-scope scanning with a somewhat hyperbolic vertical range sweep which may be further varied as a function of the profile of the terrain under investigation where the terrain is not reasonably flat (perpendicular to the local vertical). The sweep signal is developed in a somewhat-basic, synthetic form, for depicting large flat areas (as generally presented by airports). Means are also disclosed for varying the standard in accordance with altitude. A form of the system is also disclosed to vary the display in accordance with roll and pitch of the aircraft. Furthermore, various registration systems are disclosed whereby the perspective display is registered or referenced with regard to the terrain under investigation, as to indicate when the terrain is irregular. Some forms of registration incorporate structure for obtaining accurate visual display of actual irregular terrain. Also means is disclosed for determining (by means of the radar/display) if the aircraft is above or below the predetermined glide slope angle with respect to the local vertical and the end of the runway or landing zone.

3 Claims, 10 Drawing Figures

INVENTOR.
DAVID W. YOUNG
BY Nilsson & Robbins
Attorneys

INVENTOR.
DAVID W. YOUNG
BY
Nilsson & Robbins
Attorneys

INVENTOR.
DAVID W. YOUNG
BY
Nilsson & Robbins
Attorneys

INVENTOR
DAVID W. YOUNG

INVENTOR.
DAVID W. YOUNG

AIRCRAFT CONTAINED PERSPECTIVE RADAR/DISPLAY AND GUIDANCE FOR APPROACH AND LANDING

BACKGROUND OF THE INVENTION

One of the most severe problems that is commonly experienced in the operation of both private and commercial aircraft involves landing the aircraft during periods of bad visibility. Ramifications of the problem extend from mere matters of inconvenience to disastrous aircraft crashes.

One solution to the problem that has been practiced in the past, involves ILS (Instrument Landing System). Such systems have attained various degrees of sophistication; however, essentially through the cooperative operation of one part of the system located on the ground, and another part of the system carried on the aircraft, the pilot (or automatic) is provided with information to land the aircraft without visual contact. One of the difficulties, however, is the cost of installing and maintaining such systems. As a consequence, of the vast number of paved and lighted runways in the United States, a relatively small percentage are equipped with ILS. Those airports which do not have ILS, and there are many, are essentially "closed" during intervals of poor visibility (low overcast or fog). As a consequence, a considerable need continues to exist for a system that is self-contained on an aircraft and which enables safe operation of the aircraft at low altitudes (as in landing) during periods when visibility is poor or non-existent. Such considerations as economy, reliability, size and availability of suitable antenna space are exceedingly important in such a system.

To accomplish a higher margin of safety, in landing the presently-proposed aircraft of unprecedented size, a need is felt to maintain some human control or monitoring function as during an instrument-controlled landing. Specifically, although such aircraft may be landed entirely by computerized control (during conditions of zero visibility) an increased safety factor would be felt by providing the pilots with information to monitor the automated landing. Consequently, a need exists for a system to provide pilots with a somewhat-conventional perspective presentation that can be effectively used to monitor an instrument-controlled landing, as during periods of zero visibility.

In general, the present system may be embodied in an economical unit that is wholly contained on an aircraft, to provide an accurate perspective display that is similar to the visual pattern that would actually be observed by a pilot in the course of landing an aircraft. In a simple embodiment, the system may operate on the assumption that the terrain under investigation is flat, as would normally be the case for most airports. In using such an embodiment, the pilot will relay upon other instruments for indications of pitch, roll and so on. However, in most sophisticated forms of the system, as disclosed herein, the display may include pitch and roll indications as well as other ground-registration indications, including pictorial indications of variations in the terrain. Thus, the system may be embodied to various degrees of sophistication in accordance with economic, weight and other considerations.

DETAILED DESCRIPTION OF THE ILLUSTRATIVE EMBODIMENTS

Figure 1:
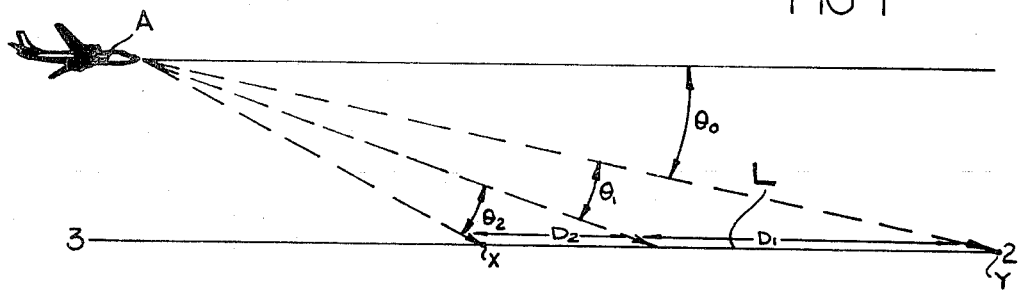
FIG. 1 is an elevational diagram illustrative of the operation of a system constructed in accordance with the present invention.

Referring initially to FIG. 1, an aircraft A is represented in flight, at low altitude as during a landing, over level terrain L. In perceiving the approaching terrain L viewed from the aircraft (either visually or by radar scanning) the terrain may be divided into a plurality of components D each of which lies within a sector of observation defined by an increment of depression angle $\theta$. Analyzing the presentation of FIG. 1, it may be seen that the angle $\theta 1$ is equal to the angle $\theta 2$, however, the length of the terrain component D1 is greater than the length of the terrain component D2. Thus, in scanning the terrain L in a depression angle from the horizontal, an observer on the aircraft A perceives decreasing lengths of the terrain L in deflecting through a given angle, as the depression angle is increased. Of course, this phenomenon is the basis of perspective and is well appreciated; however, FIG. 1 is particularly illustrative of the phenomena as applicable to the present invention.

Figure 2:
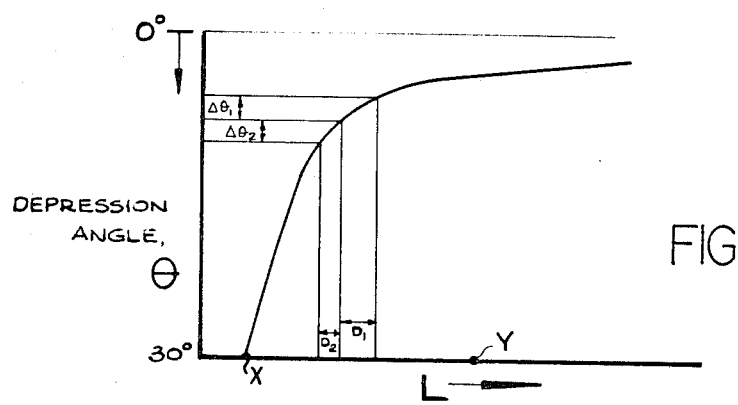
FIG. 2 is a graph depicting pheomena of concern in the operation of a system constructed in accordance with the present invention.

Relating the perspective pheomena as illustrated in FIG. 1 to a graphic presentation (FIG. 2) assume that a sensing instrument (radar with antenna) illuminates the terrain L from a point X to a point Y and beyond, observing a single vertical plane or slice of the terrain profile. Conventional radar will provide radar return from the terrain at a constant rate, and consequently it is apparent that the length of terrain observed will eventually become asymptotic with reference to depression angle deviation. Specifically, the initial echo radar energy is received from angle $\theta 2$ corresponding to a length of the terrain component D2 after which, radar energy is received from angle $\theta 1$ corresponding to a greater length of the terrain sensed. Generally, the relationship of the length of terrain from which radar energy is returned to the observed deflection angle is a rectangular hyperbolic function as depicted in FIG. 2. That is, as the observed-depression angle is increased (from horizontal downward) the length of terrain sensed varies in a rectangular hyperbolic function as indicated in FIG. 2.

In general, the present invention recognizes such a phenomena to adjust the vertical scanning rate of an illuminated spot or beam on a display and thereby accomplishes a perspective presentation. More specifically, systems incorporating the present invention compress information observed near the horizon with respect to information received near the aircraft to accomplish a truly perspective presentation. Thus the vertical sweep having sufficient amplitude has a rectangular hyperbolic characteristic, with time and voltage axes as asymptotes, i.e. voltage equal reciprocal of time (approximation of Sin $\theta$ = altitude/range).

Figure 3:
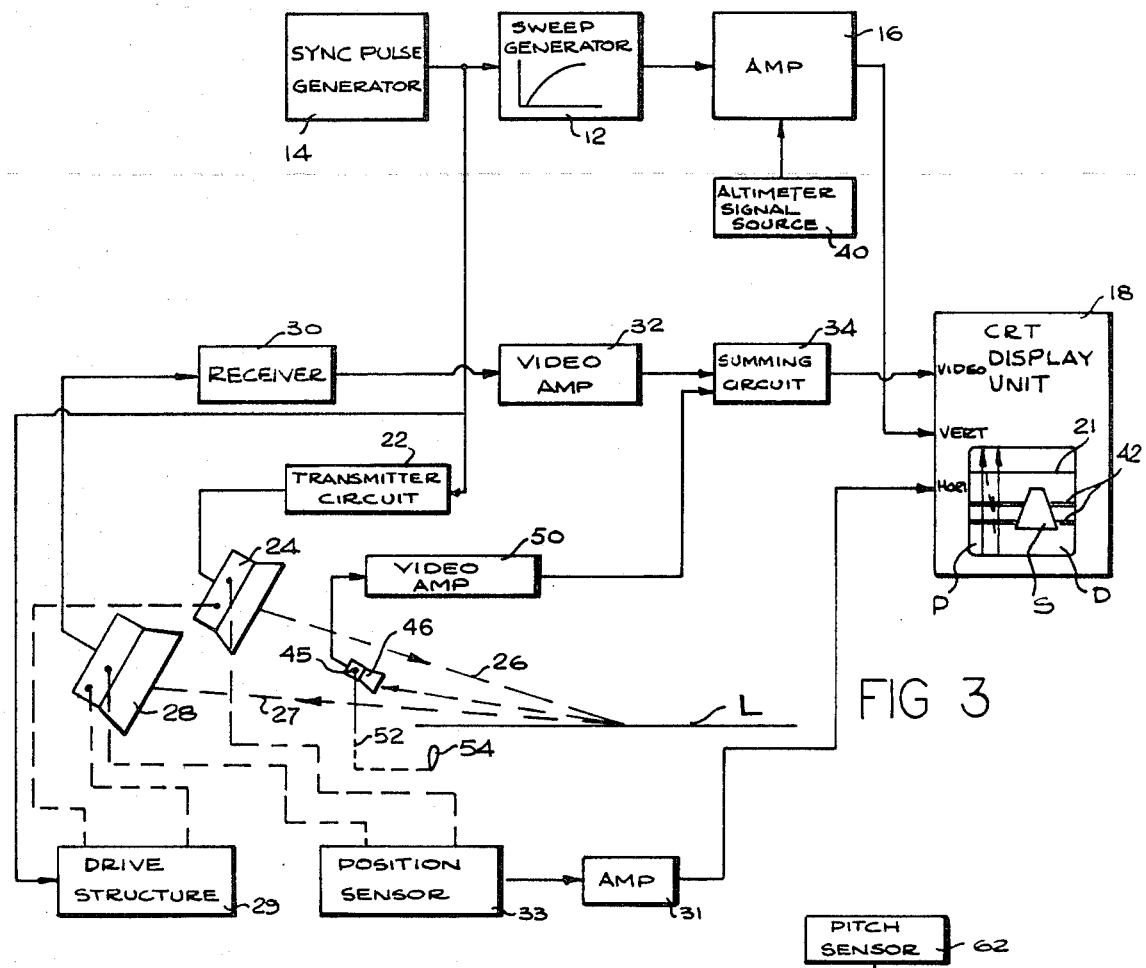
FIG. 3 is a block diagram of a system constructed in accordance with the present invention.

Referring now to FIG. 3, a cathode ray tube display D is illustrated showing an aircraft landing strip S. The pertinent consideration is the fact that the strip S is presented in perspective. Consequently, the pilot utilizing the display to land the aircraft views a display that is similar to the one which he is accustomed to viewing during the course of landing the aircraft under conditions of good visibility.

The presentation or display D is provided, as generally well known in prior art, by cathode ray beam (or similar solid state devices) excitation whereby a beam sweeps a vertical raster pattern as represented by scanning lines P. However, a distinct difference of the system hereof resides in the fact that the vertical scansions in the raster pattern are distinctly non-linear with regard to time. That is, the individual vertical scansions vary with the degree of deflection (time related) to accomplish a perspective presentation.

In general, when the terrain under investigation is flat, the sweep voltage driving the beam to accomplish the vertical scansions will be somewhat hyperbolic (as indicated above) for each and every sweep. However, in the event the terrain under investigation is irregular, the sweep voltage accomplishing the scansions P may be provided in more complex forms to accommodate changes in the terrain as considered in detail below.

Prior to considering the structure of the system of FIG. 3, certain basic matters should be established. Specifically, assume initially that the philosophy of operation is premised upon the assumption that the terrain under investigation is flat. Consequently, the sweep generator 12 (upper central) repeatedly provides the somewhat-hyperbolic synthetic sweep output, as represented.

The system of FIG. 3 is synchronized by a sync pulse generator 14 as well known in the prior art and widely employed in radar systems, and sometimes referred to as a PRF generator. Pulses from the generator 14 initiate the operation of the sweep generator 12 to provide the vertical sweep voltage through an amplifier 16 to the vertical drive input of a cathode ray tube (CRT) display unit 18. The sync pulse generator 14 is also connected to synchronize the beam position through the drive structure (for rapid scan and low PRF only) 29, as well known in the prior art.

The generator 14 is also connected to a block 22, designated transmitter circuits, which provides a pulse of energy, which when supplied to a transmitting antenna 24 (mounted on the aircraft A) produces a pulse of traveling wave energy as represented by a dashed line 26. The pulse of traveling wave energy transmitted by the antenna 24 strikes the terrain L to produce echos as indicated by the line 27 which are sensed by a receiving antenna 28 (mounted on the aircraft A).

The echos sensed by the antenna 28 are converted into electrical echo signals and coupled through a conventional radar receiver 30 to a video-amplifier 32 for display processing. The output of the video amplifier 32 (video signal) is applied to the video input of the CRT display unit 18 through a summing circuit 34 as will be described in detail below.

In general, the traveling wave energy echos that are sensed by the antenna 28, are indicated in space relationship to the represented approaching terrain by the CRT display unit 18. That is, echos from near objects are indicated at the bottom of the display D while echos from remote objects (requiring a longer travel interval) are indicated at the top of the display D. Each individual sweep thus indicates one planar slice or segment of the terrain. The antenna pattern 24 is a thin fan beam, thin laterally and wide in elevation. The thin fan beam lies in the same plane as the vertical sweep on the CRT and is in general in a plane at right angles to the plane of the aircraft's wings.

Alternatively, the fan beams of the two antennas 24 and 28 may have the same width, in which case both beams are scanned together or one of the antennas (either one) chosen to have a thin beam may be scanned inside of a wide beam provided by the other antenna. Again, both antennas functions may be combined in one to provide a single thin fan beam.

In one embodiment hereof, the transmitting antenna 24 transmits a narrow vertical beam and the receiving antenna 28 senses all echos reflected therefrom. Thus the terrain is observed as a series of vertical "slices" further dissected by reason of the time relationship of return echos as positioned by the non-linear sweep.

In an alternative and more sophisticated arrangement, the antennas are in a form disclosed in U. S. Pat. No. 2,713,161 and driven by the drive apparatus 29 as also disclosed in the patent. In such an arrangement, the transmitting antenna 24 provides a sequence of narrow horizontal energy patterns while the receiving antenna receives energy in the form of a vertical narrow pattern. As a result, echos are selective in the region of intersection of the two patterns which may be scanned over the terrain in synchronism with the scanning in the CRT. Consequently, a display of high definition is provided when such an arrangement is incorporated for combinations of large depression angle and low altitude and for a check of registration, i.e. true flatness and true altitude with respect to the terrain when used with the variable sweep system hereof. Typically, if the transmitter pulse width is $1\mu s$ (500 ft of radar range) normally the receiver pulse width would also be $1\mu s$ but actually the receiver antenna receives energy from a point target or scatterer on the ground only for the time it takes for the echo beam to pass across the target limiting the receive pulse width to the transit time, say $0.1\mu s$ which provides a 10/1 improvement in elevation resolution. It has been established that for very large depression angles and very low altitudes the entire scheme of Pat. No. 2,713,161 including the sweep technique gives greater resolution and does not have any dependence on altitude sensing or the assumption that the terrain is flat. However, for small depression angles (most often used by commercial airlines) the hyperbolic sweep is best. The combination of the two techniques is unique. There is the element of "fail safe" and one technique can be used to check the other i.e. register when both are combined.

Returning now to the consideration of the system of FIG. 3, the occurrrence of a pulse from the sync pulse generator 14 concurrently: (1) actuates the transmitter circuit 22 to transmit a pulse of traveling wave energy as indicated by the line 26; (2) initiates the operation of the sweep generator 12 to actuate the display unit 18 so that the beam therein begins a vertical sweep and (3) synchronizes the operation of the antenna drive structure 29. Immediately after a pulse of energy is transmitted, echos from the pulse are sensed by the antenna 28 to be converted into echo signals which are passed through the receiver 30 to the video amplifier 32 and supplied to the CRT unit to intensify the beam and produce elements of the display D. Specifically, as well known, in the prior art, echo signals activate the beam to produce visible excitation on the face of the CRT display unit 18 which is representative of the approaching terrain. That is, the beam in the unit 18 is moved coincident with the incremental areas of the approaching terrain under consideration. Thus, an echo signal energizes the beam to produce a visual manifestation. It is to be noted that the horizontal deflection signal or sweep for the beam is received from an amplifier 31 which is connected to receive a drive signal from a position sensor 33 (as well known in the prior art) for the antennas. As indicated by dashed lines, the position sensor 33 is mechanically coupled to the antennas.

In the operation of the system of FIG. 3, the beam deflection is controlled by sweep signals, the vertical of which are provided from the sweep generator 12 as a somewhat hyperbolic sweep voltage to compress the top of the display D with respect to the bottom thereof and accomplish a uniform relationship of the areas in between. In this regard, the non-linearity of the sweep is emphasized as indicated in FIG. 4, which shows the family of curves wherein time, i.e. response interval, is plotted against the instant angle of scan $\theta$ which also coincides to beam displacement or sweep amplitude.

The different curves 38 are indicated for different operating elevations, and in that regard it is to be noted that the lower the operating altitude of the aircraft, the more pronounced is the knee or transition of the curve. Thus, as would be anticipated, from the curves 38 it is apparent that an aircraft operating at low altitude perceives a sharper transition between the space immediately therebelow and a remote space, than does an aircraft operating at a higher altitude.

As indicated, the family of curves 38 also represent the deflection voltage or sweep for the CRT display unit, (FIG. 3). That is, the sweep generator 12 develops a curve 38a as the basic operating curve for the low altitude operation. Such a curve may be provided from a permanent-storage computing apparatus, or may be developed by various forms of static or dynamic summations of non-linear R-C circuits as well known in the prior art.

Figure 4:
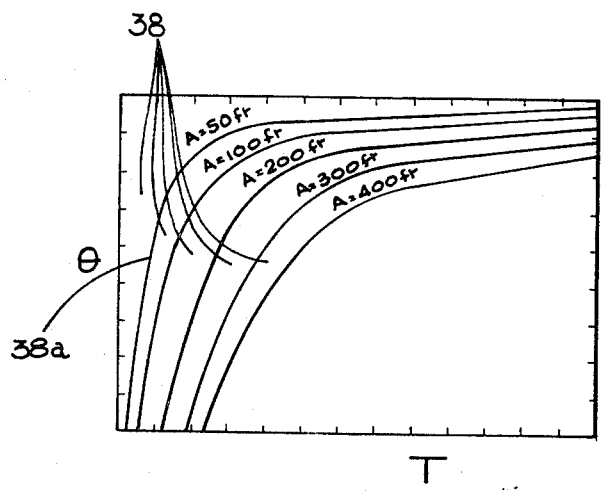
FIG. 4 is a graph illustrative of the operation of the structure of FIG. 3.

The sweep curve 38a provided from the sweep generator 12, as indicated in FIG. 4, is represented on the basis of amplitude verses time. To vary that curve, the amplifier 16 receives a variable bias from an altimeter signal source 40 so as to produce the other curves 38 in the family as indicated in FIG. 4.

The altimeter signal source 40 may comprise, any of a variety of units capable of developing a control signal for the amplifier 16 which varies as the altitude of the aircraft, e.g. pressure sensitive, radar, or others. Specifically, for example, the altimeter signal source 40 may comprise any of the variety of widely-used altimeters with a variable-voltage output proportional to altitude. Alternatively, the altimeter signal source may comprise a more sophisticated structure as the radar altimeter disclosed in U. S. Pat. No. 3,165,739.

Recapitulating, as the altimeter signal source 40 provides a bias-signal output to the amplifier 16 which varies as the instant altitude of the aircraft, the amplifier 16 produces one of a family of curves substantially as shown in FIG. 4; however, plotted on the basis of sweep signal amplitude verses time. The development of such curves by a common amplifier will be readily apparent to those skilled in the art of signal amplifiers. The curves define the sweep patterns for the CRT display unit 18 to accomplish a perspective display D, which vary in accordance with the instant operating altitude of the aircraft. It is noteworthy that the horizontal sweep (from circuit 31) may be linear or a sine wave in nature, depending only on the scan rate of the azimuth scanning antenna and scan position. Thus, the raster pattern is time swept with the vertical sweeps being made in a hyperbolic time relationship.

Essentially, the lower portion of the display D is swept very rapidly. On the contrary, the upper portion of the display (remote region of the terrain) is swept slowly as slight displacement indicates a considerable distance on the terrain. The two distinct sweep rates are joined by a transition to provide the rectangular hyperbolic sweep considered above, and which accomplishes the desired perspective display D.

In addition, to providing a perspective display, as indicated above, it is frequently important to include indications whereby the display is registered or referenced with regard to the terrain and the aircraft. In the embodiment of FIG. 3, a pair of generally-horizontal bands 42 are presented in the display D, which define the terrain depicted with reference to the aircraft carrying the radar system. As indicated above, the radar system illustrated in FIG. 3 assumes that the terrain under investigation is regular and substantially flat. Consequently, it may be advisable to provide an indication of contrary terrain in the display D. It may also be similarly advisable to provide an indication of the relationship, of the aircraft to the terrain in the display of D, e.g. pitch or roll, altitude.

The registration bands 42 are provided in the display D from a narrow-field receiving antenna 46 affixed to the aircraft A. Such antennas are well known in the prior art as described in the above-referenced U. S. Pat. No. 2,713,161 and may be made to produce two beams or more, typically 1° × 90° each. The antenna 46 is oriented to receive narrow horizontal patterns of energy reflections that are radiated by the transmitting antenna 24. The patterns so received afford a selected band of echos from the terrain, which are formulated into selective echo signals for amplification by a video amplifier 50, the output of which is supplied to the summing circuit 34 with the broad region video signals supplied from the video-amplifier 32. The summing circuit 34 combines the selected-space echo signal represented by the video-output from the amplifier 50 with the major echo signals (provided as video-output from the amplifier 32) to accomplish the display D, including indications of the terrain in perspective and additionally providing the relatively-narrow band 42 in which the display is intensified by reason of the added video signal.

If the terrain under investigation is irregular, and for example includes a hill or other substantial land deviation, the narrow bands of the reflected echos indicates such deviations and accordingly distorts the bands 42 in the display with the result that the deviation in the terrain is manifest. Similarly, if the aircraft carrying the antenna 46 rolls or pitches, the displacement is indicated by the bands 42 on the display. In this regard, it is to be noted that the narrow pattern receiving antenna 46 may be mounted for manual control as indicated by a linkage 52 connecting the antenna 46 to a handle 54. Thus, the antenna 46 may be moved about a pivot point 45 to scan through the entire display D either from top to bottom, or from bottom to top. Consequently, the person observing the display D may selectively intensify selected portions thereof to accomplish registration for the remainder of the total display. While runways are normally reasonably flat and horizontal to the local vertical, sometimes the approach to the runway contains terrain much lower and sometimes a little higher than the plane of the runway. If the measured altitude of the aircraft (radar altimeter) is used to amplify the output from the hyperbolic function generator an attempt will be made to display a runway in the aircraft as if the aircraft were higher with respect to the runway than actual. In this case the registration bands will be lower on the display than the altitude of the aircraft and the manual positioning of the bands would imply (independent of altitude and position of the bands) they should remain at a constant spacing, say 3° apart and the elevation thickness of the beams should remain approximately the same and constant, say 1°. If an attempt was made to display the runway as if the aircraft were higher than actual, the bands would be closer together on the display in the region of the runway and the width of the bands would be abnormally thin.

The narrow receiving patterns may be pitch stabilized with a servo or electronically, as is well known in the art, to provide a unique guidance technique for control of the altitude of the aircraft which is provided where there may be some distortion in the perspective display due to a less than perfect hyperbolic function generator or measure of altitude. The bands may be set for a 3° depression and pitch stabilized, assuming a 3° approach is desired. As the aircraft maintains altitude and airspeed constant as the approach is made, should the aircraft descend at too great a rate to assume a position below the 3° glide slope, band 42 will pass the end of the runway. An increase in lift will correct the aircraft position. Even if the wrong altitude is measured and the hyperbolic function generator is distorted, the bands 42 will only be on the end of the runway if the aircraft is at the correct altitude, assuming the attitude stabilizing of the receiving antenna 46 is correct.

Figure 5:
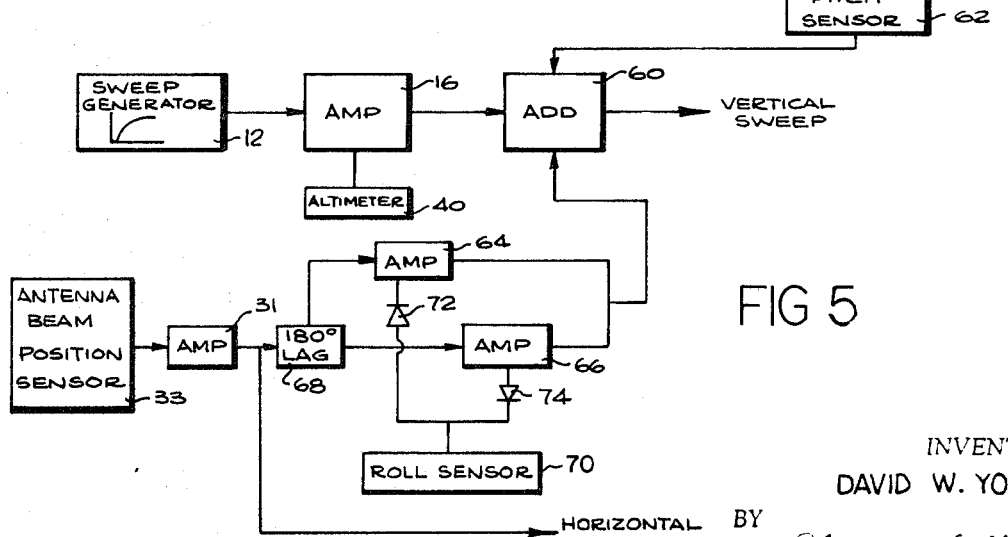
FIG. 5 is a block diagram of a portion of the system of FIG. 3, shown in greater detail.

Another technique for registering the display D with the actual terrain and its relationship to the aircraft involves the introduction of specific pitch and roll information into the display sweeps. That is, the system may be implemented so that the display D varies to indicate pitch and roll of the aircraft just as these movements would appear to a pilot viewing the landing strip during a landing. Pitch and roll information may be introduced into the display by adjusting the output from the sweep generator 12 (FIG. 3) in accordance with the output from existing gyro pitch and roll sensors as well known in the prior art. A system for such operation is disclosed in detail in FIG. 5, which system may be employed to replace the sweep generator 12 as shown in the system of FIG. 3.

The output from the sweep generator 12 is processed through the amplifier 16 (controlled by the altimeter 40) as previously explained. However, in the system of FIG. 5, the hyperbolic function is applied to an adder circuit 60 which is connected to receive modifying signals to manifest pitch and roll. A pitch sensor 62, in conventional form, provides a d.c. output to the adder 60 which is indicative of the aircraft pitch up or down. That signal is simply added to the sweep from the amplifier 16 to move the display up or down as the aircraft pitches up or down.

The incorporation of a roll aspect in the display is somewhat more complex.

As the aircraft rolls, the centers of the bands 42 do not move, but one side moves upward and the other side linearly moves downward. The antenna beam position sensor 33 is a d.c. voltage proportional to azimuth position of the antenna beam, and in the system as previously described provides the horizontal sweep. For an indication of roll, the output of the antenna beam position sensor 33 is coupled through two amplifiers 64 and 66 and a 180° phase lag network 68. The amplifier 64 increases gain only when the output from a roll sensor 70 is positive (right roll). The amplifier 66 amplifies only when the roll sensor indicates a negative roll (left roll). When there is no roll both amplifiers have the same gain and the outputs are summed, but are 180° out of phase thus no output is introduced and indeed there is no roll. When there is a negative roll (left roll) amplifier 66 operates and the horizon line on the extreme right is provided by a most positive output from the antenna beam position sensor 33 as the horizontal sweep, but at the same time the 180° lag network and amplifier 61 are working fully giving a full negative output and pulling the right side of the horizon line down and then raising the left side.

The inverse control of the amplifiers 64 and 66 is accomplished by a pair of diodes 72 and 74 coupled between the roll sensor and the amplifiers 64 and 66 respectively. Thus, the amplifiers 64 and 66 are bias controlled to tip the display in accordance with roll signals.

Figure 6:
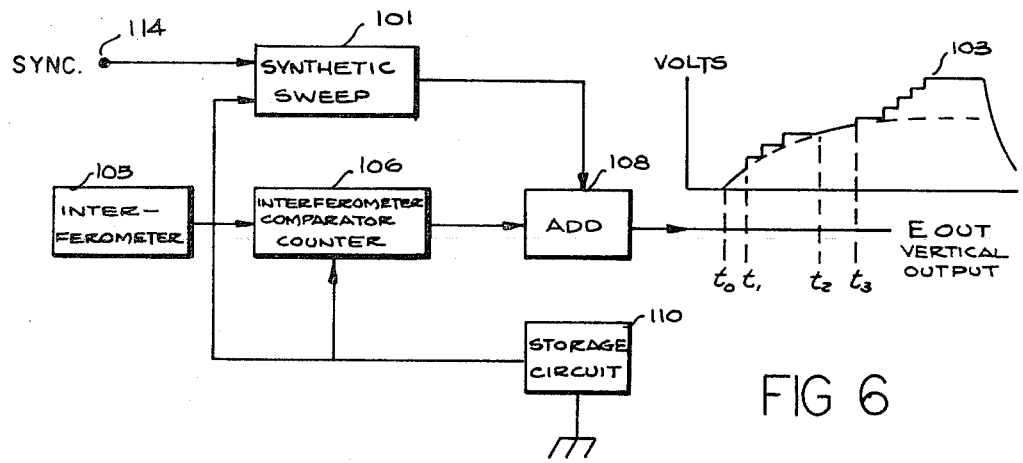
FIG. 6 is a block diagram of alternative embodiment constructed in accordance with the present invention.

In addition to various forms of the registration techniques and structures considered above, the system hereof may also provide an actual presentation of the underlying terrain in the display. As described above, the accomplishment of a perspective display for a horizontal scanning pattern involves the provision of a somewhat-hyperbolic sweep signal to conform the scanned information into a perspective display. As explained, the sweep signal may be deviated to indicate pitch and roll and additionally, modified on the basis of the instant operating altitude of the aircraft. In still another embodiment of the invention, the radar system analyzes the terrain under investigation and modifies the perspective plot in accordance with that terrain. That is, as indicated above, the previously-described system assumes that the terrain under investigation is flat and regular, as would normally be the situation for an improved airport. However, the system hereof also may be embodied in a form to incorporate an analysis of the actual terrain and vary the perspective display accordingly. Basically, this increased capacity is provided by sensing deviations from a flat terrain and modifying the vertical sweep rate, as explained above, to similarly modify the display. A form of the structure is shown in FIG. 6 and will now be considered in detail.

The system includes a synthetic sweep circuit 101 which provides the basic generally-hyperbolic sweep as previously described. The output from the sweep circuit 101, is combined with a step function signal that is representative of the terrain to provide the actual sweep, an exemplary form of which is indicated by a curve 103. The information for the step function is provided by an interferometer as well known and widely employed in systems of prior art. Specifically, one form of interferometer is disclosed in a book entitled "The Exploration of Space by Radio" by R.H. Brown and a C. B. Lovell, published in 1957 by Chapman & Hall Ltd., London, in a section beginning on page 39 thereof.

Generally, interferometer systems produce information indicative of the surface configuration of the terrain under consideration. As well known in the prior art, the output from an interferometer (utilizing the combined information from a plurality of separate antennas) is a phase derived signal that is indicative of the actual terrain under investigation. As shown in FIG. 6, the output from the interferometer 105 is supplied to a counter and comparator 106 which provides step signals indicative of terrain protuberances to be combined with the basic sweep signal in an adder 108.

Considering the embodiment as generally described with reference to FIG. 6, in greater detail, the adder 108 supplies the sweep signal to be used, e.g. curve 103 and is also coupled to a storage circuit 110 which provides stability information to the interferometer 106 and the synthetic sweep circuit 101. The sweep signal, as represented by the curve 103, is essentially a presentation of a terrain profile superimposed on the basic somewhat-hyperbolic sweep signal. Considering an actual sequence of operation in the system of FIG. 6, the unit is timed as indicated previously by receipt of a sync pulse that is applied at a terminal 114. After a suitable delay, the output from the sweep circuit 101 begins deflecting the CRT beam upward as indicated, between the time intervals $t_0$, $t_1$ in the curve 103.

At the instant of time $t_1$, the comparator senses that the output from the interferometer 105 has changed polarity and consequently begins counting. At the instant $t_2$, the counter 106 stops counting either due to encountering terrain with negative slopes or areas of very low reflectivity. Consequently, the synthetic sweep regains command of the sweep potential and sweep proceeds on a basis of flat terrain between the intervals $t_2$ and $t_3$. At the instant $t_3$, the comparator again senses a polarity change in the output from the interferometer 105 and provides pulses to accelerate the deflection of the beam.

Of course, at the conclusion of the sweep operation, the sweep returns to zero with the result that the CRT beam drops back to the bottom of the display. Thus, it may be seen that spaces between the instants $t_0$ and $t_1$, $t_2$ and $t_3$ are flat terrain while the stepped portions of the curve 103 indicate targets or abrupt obstacles detected on a terrain.

Figure 7:
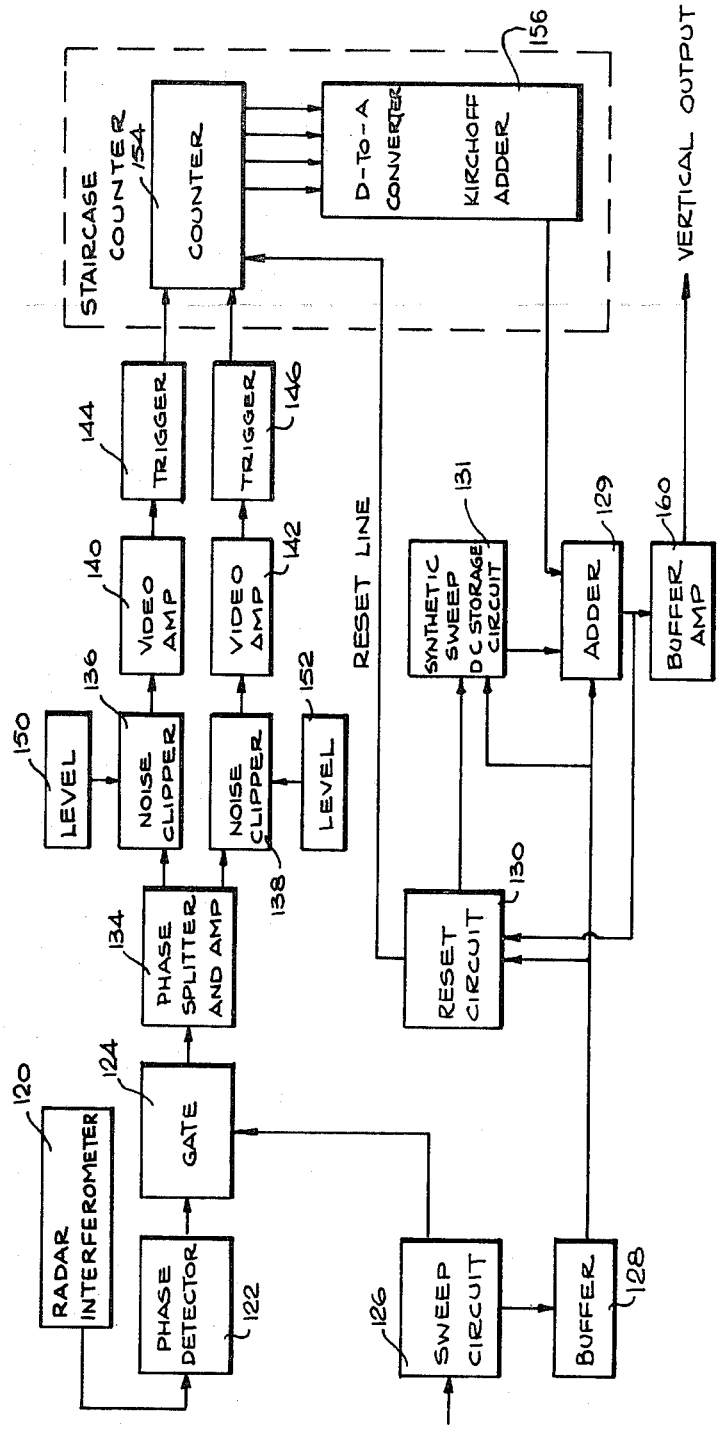
FIG. 7 is a more detailed presentation of the system of FIG. 6.

In greater detail, specifically as shown in FIG. 7, a radar interferometer 120 as well known in the prior art, provides an output to a phase detector 122 as somewhat conventionally employed in cooperation with an interferometer. Output pulses from the phase detector (indicative of the terrain under consideration) are applied to a gate 124 which passes such pulses only after the output from the sweep circuit 126 reaches a predetermined level. As previously described, the sweep circuit 126 provides the basic synthetic or somewhat-hyperbolic sweep signal which will be modified to indicate deviations from a flat horizontal terrain. The output from the sweep circuit 126 is also supplied through a buffer 128 to an adder 129 and to a reset circuit 130. The adder 129 functions to combine the basic somewhat-hyperbolic sweep signal developed by the circuit 126 with excessive deviations indicative of the terrain under consideration.

As indicated above, the phase detector 122 provides pulses indicative of the particular terrain under consideration, which pulses are supplied through the gate 124 during sweep intervals to a phase splitter and amplifier 134, as well known and widely employed in the interferometer radar art. The amplifier 134 separates the pulses, depending upon polarity, and applies them through clippers 136 and 138 and video-amplifiers 140 and 142 to triggers 144 and 146 respectively. The clippers 136 and 138 are controlled respectively by level-setting circuits 150 and 152 respectively. Consequently, the pulses are polarity separated, clipped, amplified and shaped upon emerging from the triggers 144 and 146. Each of these circuits and its function is well known in the prior art.

The output pulses from the triggers 144 and 146 are applied to a positive-negative counter 154 which may, for example, consist of 4 binary stages interconnected by gates as well known in the prior art. The output pulses from trigger 144 are tallied positively, while pulses from the trigger 146 are tallied negatively. In this manner, binary digits are stored in the counter 154 that are indicative of deviations in the terrain under consideration.

The stages of the counter 154 are connected to a digital-to-analog converter 156, the output of which is coupled to the adder 129 in the form of a varying analog signal indicative of the terrain under consideration as it is horizontally scanned. Consequently, the adder 129 adds the terrain-indicative analog signal to the sweep signal (cyclically stored in the storage circuit 131) for combination into a composite sweep which is supplied to the vertical deflection circuits for the CRT through a buffer amplifier 160.

In the operation of the system, the output from the stage adder or digital-to-analog converter 156 is compared, during each sweep interval, with the somewhat-hyperbolic sweep signal provided from the sweep circuit 126. The output from the adder 129 comprises not the total of these signals, but the higher amplitude of the sweep and the analog signal representative of terrain. That is, as long as the counter 154 is counting at levels of amplitude greater than the basic sweep (provided for flat terrain) the counter controls the sweep and provides the output from the adder 129. However, if the counter output drops below the synthetic or flat-region basic sweep, the latter gains control and provides the actual deflection for the CRT. The counter 154 is reset each time the sweep control reverts back to the synthetic sweep, ie. establishes the count level in the counter. As a result, a relatively small number of stages may be employed in the counter 154.

Considering the operation of the system in somewhat greater detail, assume the initiation of a sweep interval. At the outset, the synthetic sweep (somewhat-hyperbolic) is applied to the CRT because the line of observation is generally downward and protuberances merge with their surroundings as in a plan view. Control by the synthetic sweep continues until the sweep reaches a threshhold to qualify the gate 124 thereby enabling terrain-indicative pulses (derived by the detector 122 from signals developed in the interferometer 120) to pass to the phase-splitting amplifier 134. The opposed polarity pulses from the amplifier 134 are processed and tallied to provide a digital count in the counter 154 which is representative of observed terrain. To enable a relatively small number of stages, e.g. four, in the counter 154, it does not track the synthetic sweep. Rather, the synthetic sweep is stored in the circuit 131 as a reference for deviations that are registered in the counter 154. In that manner, the counter 154 is reset when the reset circuit 130 (amplitude comparator) determines the output from the adder 129 is no greater than the synthetic sweep signal. Thus, the terrain-representative pulses sensed by the interferometer 120 are employed to accelerate the sweep to thereby manifest protuberances in the terrain in a perspective configuration.

The interferometer could also be superimposed on the conventional hyperbolic generated perspective display as with the bands 42. One would observe a series of bands equally spaced and each the same width and running parallel to the bottom of the display. Similarly to bands 42 the bands could be stabilized by introducing an electronic phase shifter (well known) to shift the band centers up and down to stabilize for pitch and provide for guidance to the touch down point by selection of a given scan.

Figure 8:
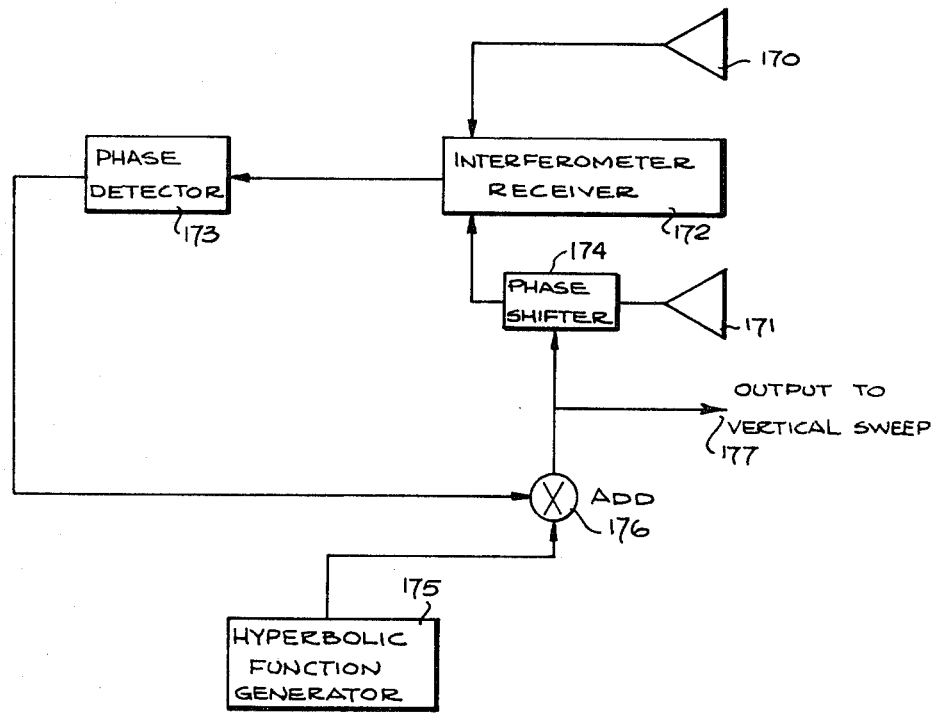
FIG. 8 is a block diagram of another alternative aspect of the system hereof.

The phase shifter technique used for pitch stabilization can be used for automatic compensation of the synthetic sweep for irregular terrain. Specifically, as shown in FIG. 8, two receiving antennas 170 and 171 each having broad patterns in azimuth and elevation (say 20° × 20°) are spaced apart by a large distance (perhaps 6 to 8 feet as in the case of below and above the fuselage). Each antenna may be as small as 2 inches by 2 inches. The usual multiple lobe structure is then obtained with the interferometer receiver and phase detector (all well known). Now, as the hyperbolic generator drives the phase shifter 174 such that one of the beams tracks the illuminating echo received from the ground in the usual manner; if the terrain is flat, no beams are cut and no output from the phase detector 173 is received. If however the terrain were gently sloping upward from horizontal the hyperbolic sweep would not be sweeping upward fast enough and the return from the terrain would begin returning more rapidly than had been anticipated in the case of flat terrain, thus the phase detector would begin to register an output that is added to the hyperbolic function generator output by the adder 176, automatically compensating the rate of sweep and providing a new automatic compensated sweep at output 177.

It may be advantageous in some instances to combine the use of altitude and the generation of the hyperbolic function in arrangements other than as described above. To provide a vertical sweep voltage corresponding directly to, say 1°, it is necessary to provide a fixed voltage at a time delay of 57.3 $\mu$s × altitude after the transmitter first operates which is synchronized with the PRF generator. Similarly, as an example, a 5° voltage would be 5 times as large as the 1° voltage and must occur at a time delay equal to (57.3/5) × altitude. This is a good approximation of $\sin \theta = A/R$ where $\theta$ is the depression angle previously referred to and R is the slant range. Thus a series of the correct time delays for specific voltages would give the desired voltage, specifically $V \alpha A/t$.

Figure 9:
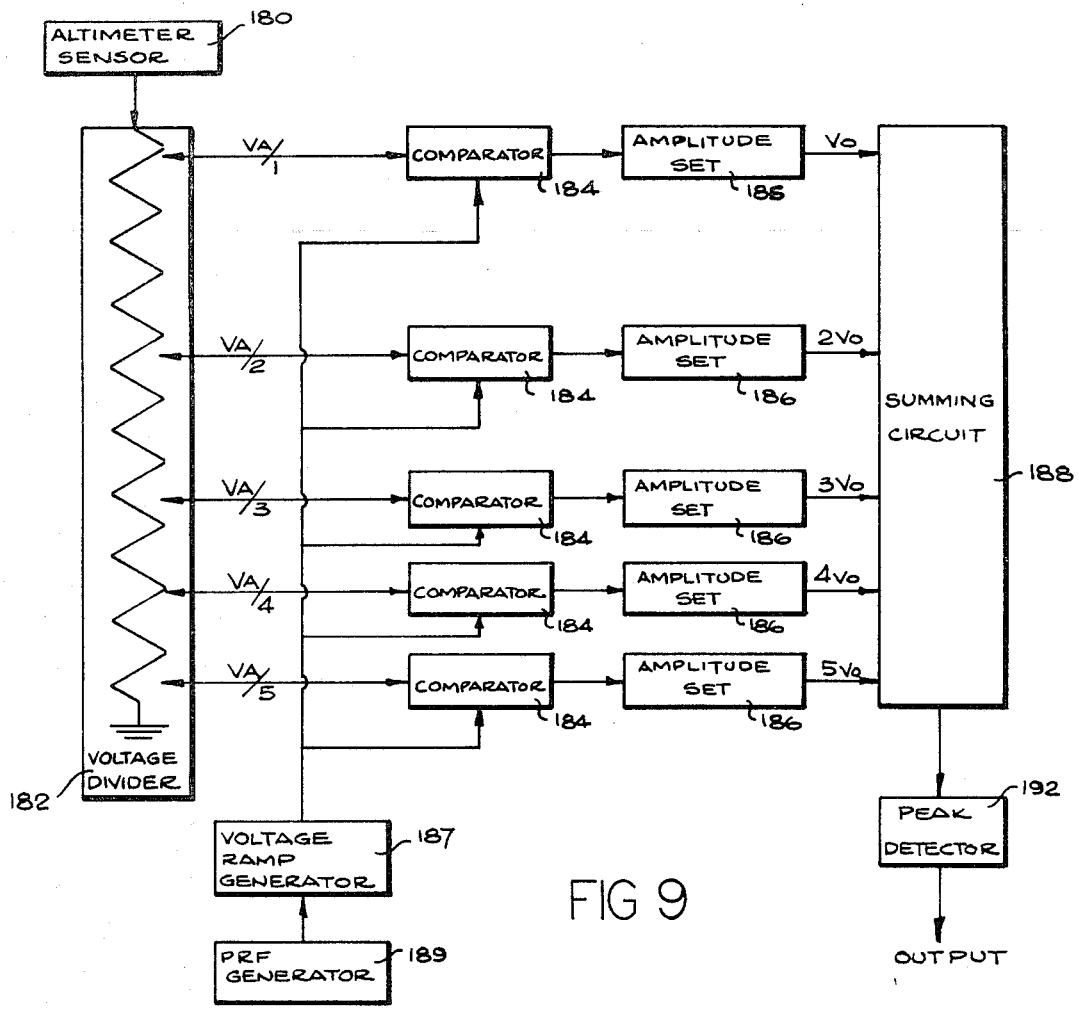
FIG. 9 is a block diagram of another alternative form of a portion of the system of FIG. 3.

Referring to FIG. 9, the voltage out of the altimeter (180), $V_A$ is divided by the divider 182 to provide the voltages $V_{A/1}$, $V_{A/2}$, $V_{A/3}$, --- and so on. These voltages are then compared in the comparators 184 with a linear ramp voltage provided from a generator 187. The comparison is synchronized with the start of time by the output from the PRF generator 189. When the voltage from the ramp generator 187 reaches a value equal to one of the divided altimeter voltages from the voltage divider 182, a very narrow pulse is generated at some time delay with respect to the PRF generator 189. One of the associated amplitude setting circuits 186 is an amplifier or attenuator to adjust the amplitude which corresponds to the time delays achieved and once this setting is made it is not adjusted again. The outputs are simply added in the sum network 188 and then peak detected in detector 192 to eliminate the pulses and provide a more smooth waveform.

Considering a specific example, assume that the altimeter-voltage ratio be at: 0.1 volt/100 ft= 0.1 volt/0.2 $\mu$s = 0.5 volts/1 $\mu$s, i.e. five tenths volts per microsecond. Further assume that the ramp or sweep generator output varies at 0.00875 volts per microsecond. Pursuing the example further, assume the current altitude to be at 200 ft. As a consequence, the altimeter voltage $V_A$ is 0.2 volts, which is compared with the output from the sweep generator 187. The output from the sweep generator 187 equals the altimeter voltage $V_A$ when the time delay initiated by the PRF generator 189 is 22.9 microseconds. That is the delay required for 1° of vertical sweep. Consequently, the initial voltage $V_O$ should be set for an output equal to 1° of deflection on the cathode ray tube which is to be controlled by the output from the summing circuit 188 when passed though a peak detector 192. That is, it has been established that a 1° deflection voltage must be provided at a time delay of 57.3 multiplied by the current altitude. In the example considered above, the altitude being 200 ft., or corresponding to a time of 0.4 microseconds, a time delay of (0.4)× (57.3)= 22.9 microseconds is required and as indicated above such a delay was provided.

While various ramp generator rates may be used, once a combination of altimeter sensitivity and ramp relationship is established, the technique for providing various voltage from the divider 182 is established. That is, a similar multiplication must occur in the output voltage $V_O$ as: $V_O$, $2V_O$, $3V_O$, $4V_O$, and so on. It is apparent in considering the circuit, that a positive characteristic waveform may be generated as well as a negative voltage and positive changes. As the first part of the waveform charges rapidly, the smaller voltage is required at the highest rate may be the most desirable technique.

Figure 9A:
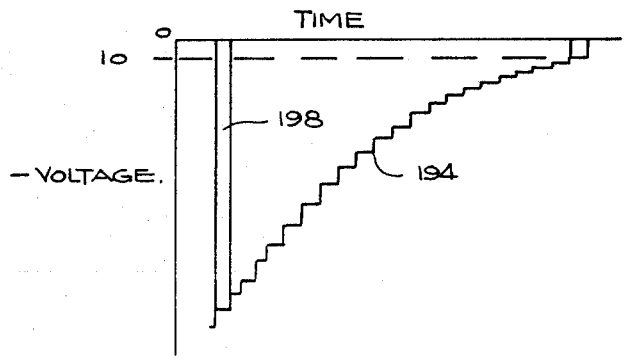
FIG. 9a is a graph illustrative of the operation of the apparatus of FIG. 9.

FIG. 9a shows a graph illustrative of the development of the sweep, wherein a plurality of negative-going pulses, e.g. volts 198, are combined to define a curve 199 affording an effective sweep. Of course, as indicated above, the curve as indicated in FIG. 9a is processed by the peak detector 192 (FIG. 9) to provide a smoothly-varying sweep signal.

It is thus apparent, that the system hereof may be employed in embodiments carried to various degrees of sophistication, depending upon the imposition of certain assumptions, e.g. flat terrain, and so on. Of course, the quality of the actual perspective display provided depends upon the assumptions imposed upon the system and these largely result from weight and economic considerations. Accordingly, the system may be variously embodied as indicated by the systems disclosed herein.

What is claimed is:

1. A radar system for presenting a perspective display of a terrain, comprising:
   transmitter means for transmitting pulses of travelling wave energy to various locations of said terrain;
   means for sensing echos of said pulses of travelling wave energy as electrical echo signals to indicate intervals between said pulses and echos therefrom in linear space-time relationship to said terrain;
   means for providing profile signals indicative of said terrain under investigation;
   means for generating a preliminary vertical sweep signal of a somewhat hyperbolic form;
   means for varying said preliminary sweep signal in accordance with said profile signals, to provide an actual vertical sweep signal; and
   display means including a display scanner for manifesting said echo signals in a perspective visual presentation, said echo signals being presented non-linearly displaced from said linear space-time relationship of said echos by application of said sweep signal to said display scanner.

2. A system according to claim 1 wherein said means for providing said signals indicative of said terrain comprises a radar interferometer system.

3. A system according to claim 2 wherein said means for providing said signals indicative of said terrain further includes phase-shift means.

* * * * *